United States Patent [19]

Piano

[11] 4,413,550
[45] Nov. 8, 1983

[54] VENTILATION SYSTEM FOR THE PASSENGER COMPARTMENT OF A MOTOR VEHICLE

[75] Inventor: Renzo Piano, Paris, France
[73] Assignee: Fiat Auto S.p.A., Turin, Italy
[21] Appl. No.: 263,066
[22] Filed: May 13, 1981
[30] Foreign Application Priority Data
   May 20, 1980 [IT] Italy .............................. 67793 A/80
[51] Int. Cl.³ .............................................. B60H 1/24
[52] U.S. Cl. ......................................... 98/2; 98/2.04; 98/2.08
[58] Field of Search .................. 98/2, 2.03, 2.04, 2.05, 98/2.06, 2.07, 2.08, 40 H; 165/43

[56] References Cited

U.S. PATENT DOCUMENTS

| | | | |
|---|---|---|---|
| 3,661,069 | 5/1972 | Grosseau | 98/2.05 |
| 3,745,906 | 7/1973 | Kakei et al. | 98/2.09 |
| 4,216,822 | 8/1980 | Izumi | 98/2.06 |

FOREIGN PATENT DOCUMENTS 2441573 11/1976 Fed. Rep. of Germany ..... 98/40 H

Primary Examiner—Albert J. Makay
Assistant Examiner—Harold Joyce
Attorney, Agent, or Firm—Merriam, Marshall & Bicknell

[57] ABSTRACT

The system comprises means for supplying into the inner space of the passenger compartment two series of air flows, and namely a first series of substantially pulsating air flows, each of which pulsating air flows is cyclically interrupted for a pre-established period of time, the said flows of the first series being supplied into the upper region of the said space, in which region normally the heads of the passengers in the said passenger compartment are situated, and a second series of substantially continuous air flows, the said flows of the second series being supplied into the low region of the said space.

8 Claims, 8 Drawing Figures

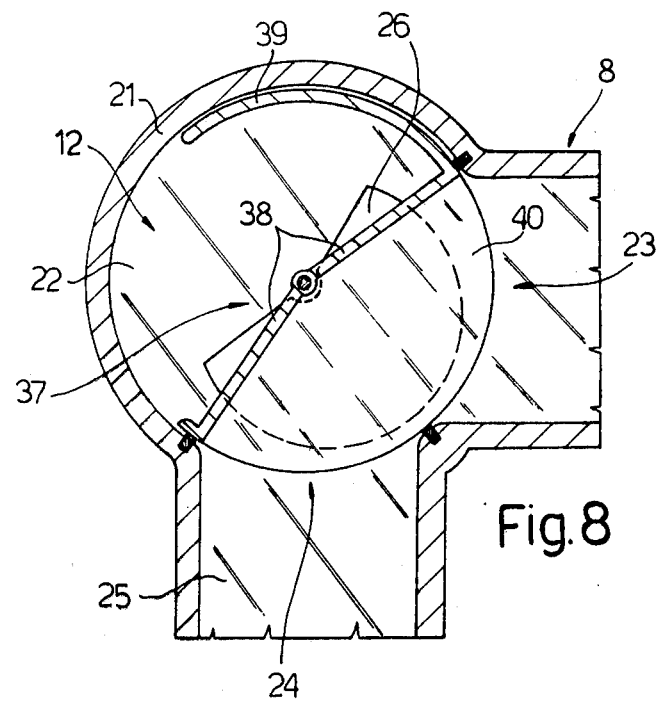
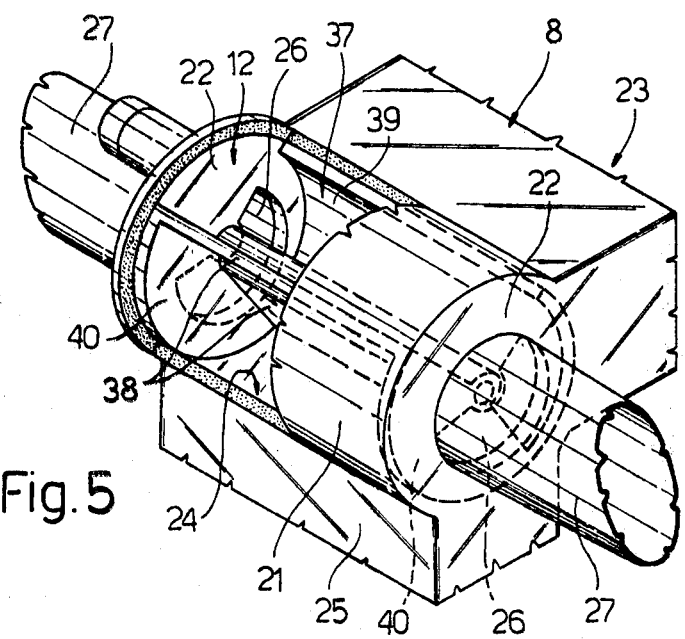

VENTILATION SYSTEM FOR THE PASSENGER COMPARTMENT OF A MOTOR VEHICLE

BACKGROUND OF THE INVENTION

The present invention relates to a ventilation system for the passenger compartment of a motor vehicle, by means of which it is possible to supply air to pre-established regions of the inner space of the passenger compartment.

The conventional ventilation systems, usually, comprise a series of conduits arranged to guide the air (at ambient temperature or suitably heated or cooled), drawn from the outside, towards one or more openings disposed within the passenger compartment; when the speed of the vehicle is low, usually a ventilator is utilized to impart to the air an energy sufficient for creating efficient flows for the purpose of ventilation.

The systems of this type have some disadvantages.

First of all, these systems, usually, do not allow obtaining sensations of coolness (or warmth) and comfort, because when the speed of the air introduced into the passenger compartment is low, no appreciable refreshing (or heating) action is produced, whilst when the said speed is rather high the flow of air becomes troublesome for the passengers because of the high energy of the air and the noise produced by this latter.

In addition, to obtain with such conventional modalities flows of air having speeds and ranges sufficient to produce a certain refreshing (or heating) action, rather powerful ventilators are required, which therefore have large overall dimensions and are costly and consume not unimportant quantities of energy.

Finally, very often the distribution of the air flows inside the passenger compartment is not uniform, with the result that refreshing (or heating) actions are obtained which are different in the various zones of the said compartment.

SUMMARY OF THE INVENTION

It is an object of the present invention to provide a ventilation system which will be exempt from the disadvantages mentioned hereinabove and thus will allow obtaining an intense and uniform refreshing (or heating) action, with low air flow speeds and, consequently, with rather small ventilators and moderate actuating energies.

It is another object of the present invention to provide a system of the type specified hereinabove, with which it will be possible to obtain a very correct distribution and adjustment of the air flows within the inner space of the passenger compartment.

According to the present invention there is provided a ventilation system for the passenger compartment of a motor vehicle, characterized in comprising means for supplying into the inner space of the said passenger compartment at least two series of air flows, and namely a first series of substantially pulsating air flows, each of which pulsating air flows is cyclically discontinued for a predetermined period of time, the said flows of the first series being introduced into the high portion of the said space, in which region normally the heads of the passengers in the said passenger compartment are situated, and a second series of substantially continuous air flows, the said air flows of the said second series being introduced into the low portion of the said inner space.

BRIEF DESCRIPTION OF THE DRAWINGS

For a better understanding of the present invention some embodiments thereof will now be described by way of non limiting examples, with reference to the annexed drawings, in which:

FIG. 5 is a perspective view of the interception means arranged to adjust the distribution of the air in some conduits of the system, which means also are part of the system itself;

FIGS. 6, 7 and 8 are sectional views illustrating the means shown in the preceding Figure, in three different operating positions.

DETAILED DESCRIPTION OF THE INVENTION

Figure 1:
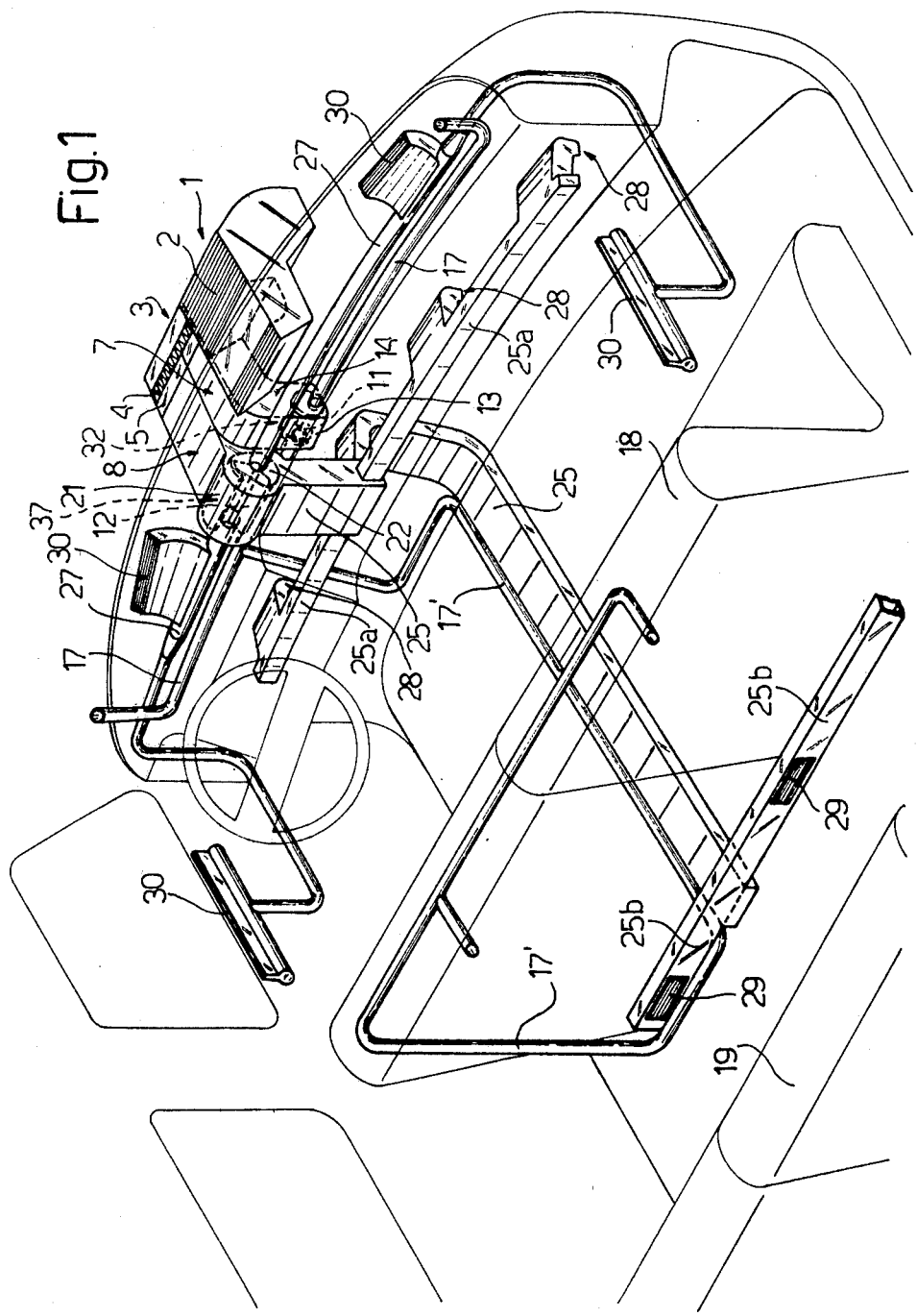
FIG. 1 is a perspective view of a first general arrangement of the system of the present invention.

The ventilation system according to the present invention comprises a first box 1 (FIG. 1) arranged to draw air from the outside through a grate 2 and to convey it, through conduits not shown, into a second box 3 arranged to introduce the said air, in a manner which will be described later, into the inner space of the passenger compartment of the vehicle; the passage of the air from the first to the second box, besides taking place through suitable openings between the said boxes, is obtained also by means of a ventilator (not shown) arranged to supply air under pressure into the inlet portion of the second box 3.

Disposed in this latter portion are suitable filtering and heating means, shown diagrammatically in the drawings and indicated by reference numerals 4 and 5.

Figure 3:
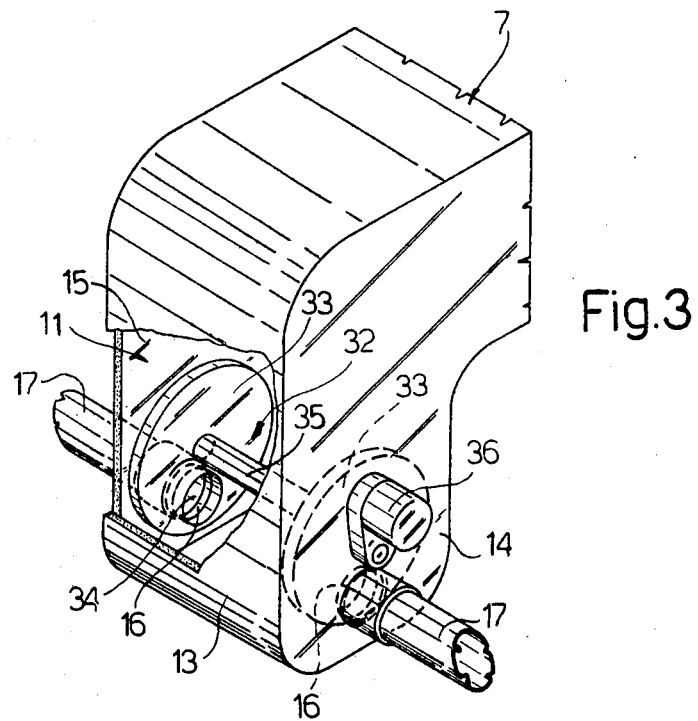
FIGS. 3 and 4 are perspective views of two different embodiments of the means arranged to generate pulsating air flows, the said means being part of the system.

The box 3 is divided into two parts 7 and 8, in which there are formed suitable conduits arranged to supply the air to a first and a second chamber 11 and 12, respectively, which are formed in the end of the boxes which is turned towards the passenger compartment and are shown perspectively in FIGS. 3 and 5, respectively.

The first chamber 11 (FIGS. 1 and 3) comprises a sidewall 13 and a pair of substantially plane bottom walls 14, 15, in each of which there is formed an opening 16 which communicates with a corresponding conduit 17 arranged to supply air at least to a corresponding opening (not shown), disposed in the high front portion of the said inner space of the passenger compartment, so that the air flow coming out from them will be directed towards the passengers sitting on the front seats 18 of the vehicle. One of the said conduits 17 communicates, through a further conduit 17' (FIG. 1), with corresponding openings (not shown) disposed in the high rear portion of the inner space of the passenger compartment, so that the flow of air coming out from these openings will be directed towards the passengers sitting on the rear seats 19 of the vehicle.

The second chamber 12 (FIGS. 1 and 5) substantially comprises a cylindrical sidewall 21 and a pair of plane bottom walls 22; air is introduced into the said chamber through a first opening 23 and may come out therefrom both through a second opening 24 formed in the sidewall 21 of the said chamber and communicating with a conduit 25, and through third openings 26 each of which is formed in one of the bottom walls 22 and communicates with a corresponding conduit 27.

The conduit 25 is arranged to supply air, through conduit sections 25a and 25b (FIG. 1), to suitable openings 28 and 29, respectively, the first of which are disposed in the low and front portion, and the second in the low and rear portion of the inner space of the passenger compartment. Each conduit 27, instead, is arranged to supply air to openings 30 disposed adjacent the inner surfaces of the glasses of the vehicle.

Disposed in the first chamber 11 (FIG. 3) are interception means, indicated generally by reference numeral 32, which are arranged to cyclically intercept the passage port between the chamber 7 and the conduits 17, in order to create a pulsating air flow in each of said conduits. The said interception means, according the embodiment shown in FIG. 3, may comprise at least a rotatable disc 33, provided with a hole 34, arranged to uncover gradually during its rotation the hole 16 formed in the respective end wall 15; conveniently, the said two discs are rigidly connected to one another by means of a shaft 35 and are entrained into rotation by a geared motor unit 36.

Figure 6:
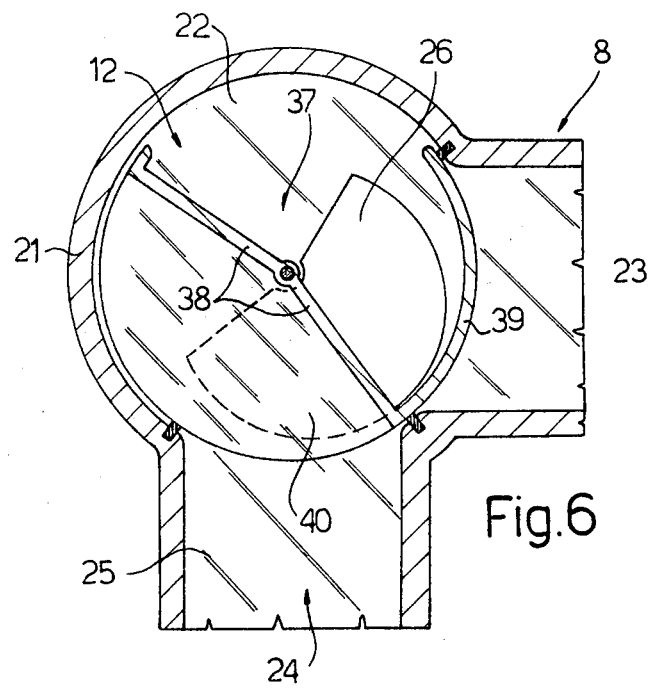
Figure 7:
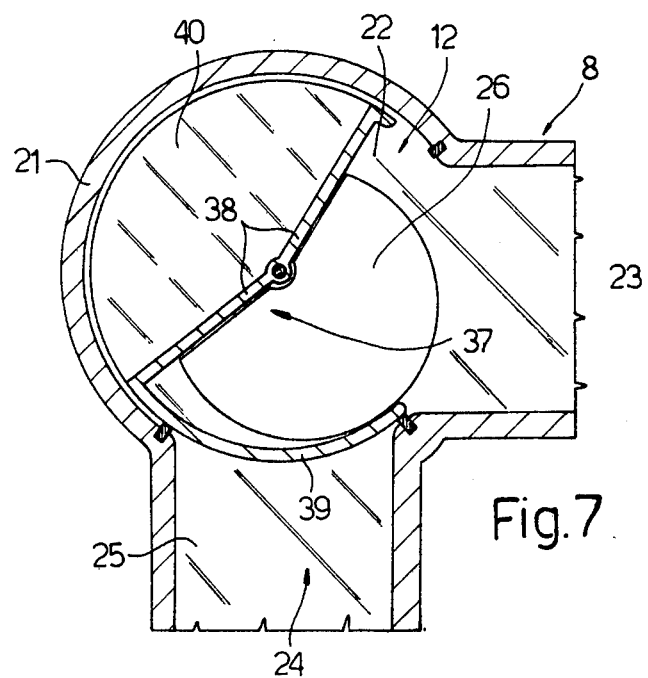

In the second chamber 12 (FIG. 5) there is disposed a manually actuable interception member 37, which is rotatable about an axis coinciding with the axis of the chamber 12; the said member, shown in section in three different operative positions in FIGS. 6, 7 and 8, comprises a pair of first plane walls 38 (FIG. 6) disposed substantially in radial planes of the chamber 12 and forming a small angle with one another, a second cylindrical wall 39 coaxial with that of the chamber 12 and projecting from the end edge of one of the walls 38, and third walls 40 which are orthogonal to the preceding walls and each of which is arranged to substantially contact a corresponding bottom wall 22 of the chamber. Each of the third openings 26 formed in the said chamber is disposed substantially sideways relative to the axis of the said chamber and preferably its contour profile is as that visible in FIG. 7, comprising an arch of circumference and two rectilinear radial sections.

The embodiment shown in FIG. 2 differs from that described hereinabove by the structure of the interception means 32 disposed in the first chamber 11 and by the arrangement of the conduits originating from the said chamber. In this embodiment, the said chamber is defined by a substantially cylindrical wall 42 (FIG. 4) provided with an opening 43 which opens into a conduit which, in its turn, communicates with a pair of conduits 45 (FIG. 2) which extend parallel to the conduit 25 for supplying air to the openings 29 (FIG. 1), disposed in the low rear portion of the inner space of the passenger compartment, analogously to the conduit 17' (FIG. 1) of the preceding embodiment. Moreover, from the conduit 44 originate two other conduits 46 (FIGS. 4 and 2) which supply air to openings 47 in the high front portion of the said space.

Figure 2:
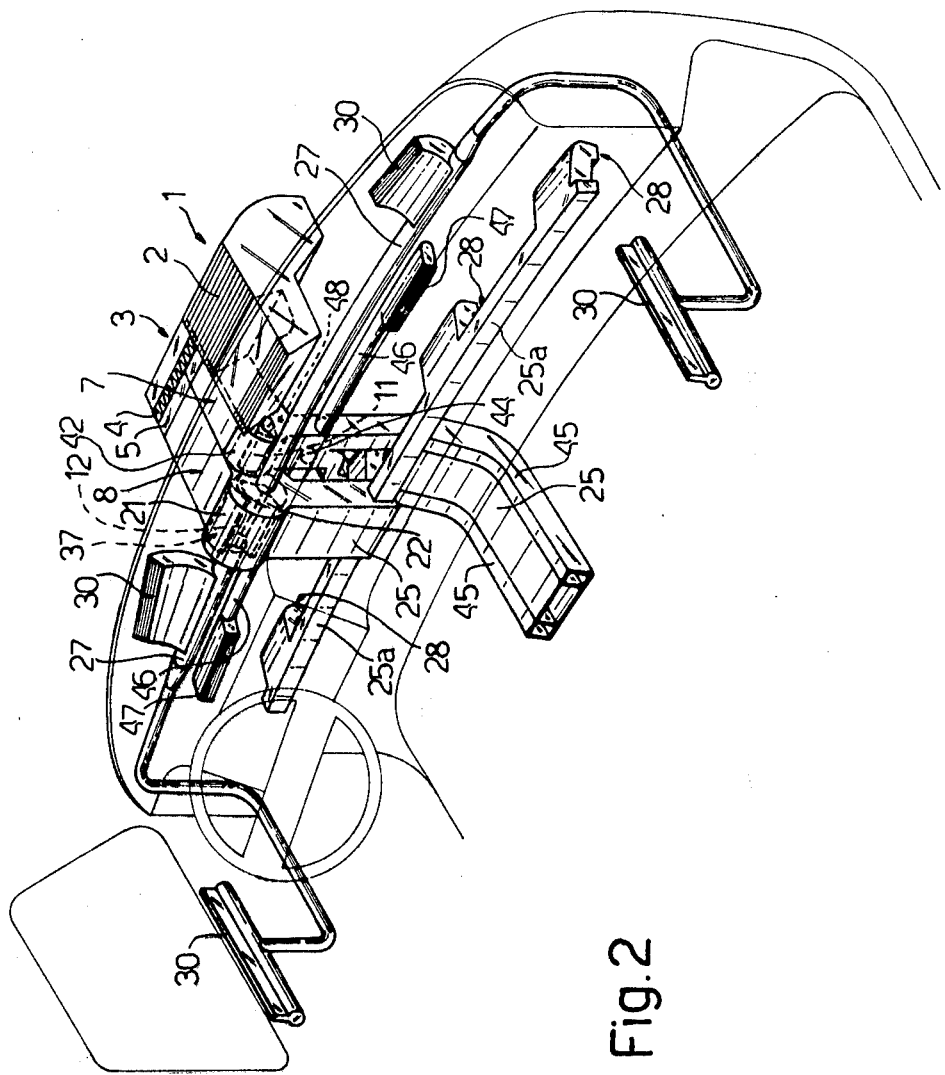
FIG. 2 is a perspective view of a second arrangement of the system.
Figure 4:
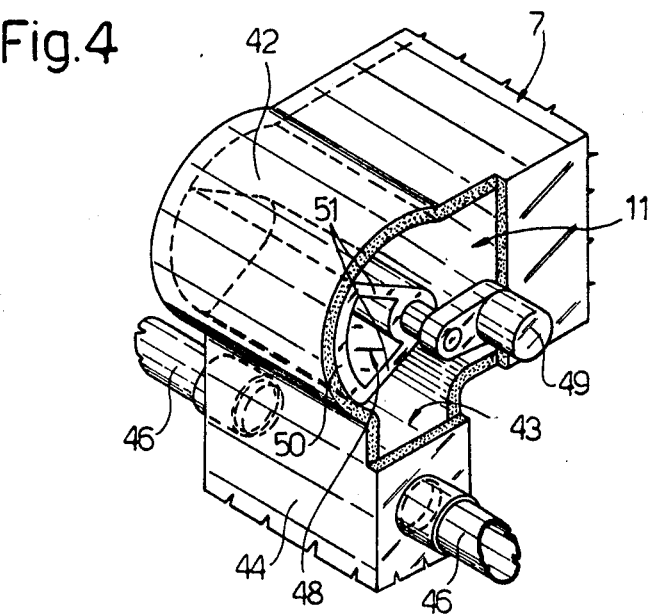

The interception means 32 of the chamber 11 of the embodiment shown in FIG. 2, which are shown in FIG. 4, comprise a rotatable member 48 operable by a geared motor unit 49 and having cylindrical wall 50 arranged to cyclically assume a position corresponding to the opening 43 to close it and interrupt the flow of air from the chamber 11 towards the conduit 44. Conveniently, the wall 50 is supported by a pair of other walls 51 rigidly connected to a actuating shaft controlled by the geared motor unit 49.

The operation of the device described hereinabove is as follows.

The air drawn from the outside through the grate 2 of the box 1 is introduced into the box 3 where it is divided into two flows (eventually controlled in a suitable manner by means of manually operated interception means not shown), one of which is directed to the first chamber 11 of the first portion 7 (FIGS. 1 and 3) of the said box and the other is directed to the second chamber of the second portion 8 of the said box.

The air flow flowing from chamber 11 towards the conduits 17 (FIG. 3) is controlled by the rotating discs 33, which are kept in rotation during the operation of the system; the air is introduced into the conduits 17 only when the holes 34 of the said discs uncover the corresponding holes 16. Thus, it is clear that in this way flows of air pulsating with a predetermined frequency are created which are directed, through the conduits 17 and 17' (FIG. 1) and the openings disposed in the high portion of the inner space of the passenger compartment, into the zones in which the upper part of the trunk of the body of the passengers in the vehicle is situated; in fact, it has been found that pulsating air flows, if they are directed towards exposed portions of the human body and in particular towards the head, are able to create an intense sensation of refreshment (or warmth, if the arm is heated).

A pulsating air flow having the same characteristics may be obtained with the interception means shown in FIG. 4; in this case, the air can come out from the chamber 11 towards the opening 43 only when the wall 50 of the rotatable member 48 uncovers the said opening.

The air which, instead, reaches the second chamber 12 (FIGS. 1, 2 and 5) may be conveyed towards the openings 30 (FIG. 1) to supply air to the inner surface of the glasses in order to obtain a defrosting action onto the said glasses, or towards the conduit 25 to supply air, through the openings 28 and 29, into the low portion of the inner space of the passenger compartment, or towards both types of openings.

When the interception member 37 is made to assume the configuration shown in FIG. 6, the wall 39 closes the supply of air to the chamber 12, and thus no flow of air takes place from the openings 28, 29 and 30; when, instead, the said interception member is made to assume the configuration shown in FIG. 7, the wall 39 closes the opening 24 and the walls 40 uncover the openings 26 and therefore the air may flow through these latter towards the conduits 27 and towards the openings 30; finally, when the interception member 37 is made to assume the configuration shown in FIG. 8, the walls 40 cover the openings 26, and the two walls 38 assume such a position as to convey the air directly from the opening 23 to the opening 24, towards the conduit 25 and, hence, towards the openings 28 and 29.

It is clear that intermediate configurations of the interception member 37 with respect to those described hereinabove are connected with simultaneous supplies of air to the openings 28, 29 and 30.

Obviously, many modifications and variations may be made to the embodiments of the invention which are described hereinabove, as regards both the shape and the arrangement of the various parts, without departing from the scope of the invention itself.

I claim:

1. A ventilation system for the passenger compartment of a motor vehicle comprising:

a first conduit system in the vehicle for supplying a first series of substantially pulsating air flows into the high portion of the passenger compartment inner space where the heads of the passengers are normally situated, and means in the first conduit system which cyclically interrupts the pulsating air flows for a predetermined period of time; and a second conduit system in the vehicle for supplying a second series of substantially continuous air flows into the low region of the passenger compartment inner space.

2. A ventilation system according to claim 1 including a first chamber into which air under pressure is supplied in a continuous manner, means for feeding the air from the first chamber to the first conduit system to introduce air into the said high portion of the inner space of the passenger compartment, and air interception means between the first chamber and the first conduit system arranged to cyclically interrupt the passage of air from said chamber to the first conduit system.

3. A ventilation system according to claim 2 in which the interception means comprises at least a rotatable disc disposed between the said chamber and the first conduit system, the said disc being provided with at least a hole able to uncover, in a pre-established range of angular positions of the disc, a passage between the chamber and the first conduit system, and motor means to rotate the disc in a continuous manner.

4. A ventilation system according to claim 3 in which the disc has a surface substantially in contact with a wall of the chamber, and the first conduit system communicates with a hole in that wall.

5. A ventilation system according to claim 3 in which the first conduit system includes a pair of conduits communicating with the first chamber and arranged to supply air into the said high portion of the inner space of the passenger compartment, each air passage between the said chamber and one of the said conduits being controlled by a said rotatable disc, and the discs are coaxial with and rigidly connected to one another.

6. A ventilation system according to claim 2 in which the first chamber is substantially cylindrical in shape and the first conduit system communicates with a perforation formed in the cylindrical sidewall of the said chamber, the said air interception means comprising a rotatable member in the said chamber and coaxial with the axis of this latter and provided with a cylindrical wall portion arranged to place itself, in a pre-established range of angular positions of the said rotatable member, on the said perforation so as to cyclically close it, and a motor to rotatably drive the said rotatable member.

7. A ventilation system according to claim 1 comprising at least a second cylindrical chamber into which air under pressure is supplied in a continuous manner and which has a cylindrical sidewall and two substantially plane bottom walls, an air inlet opening formed in the said sidewall of the second chamber, and a first air outlet in the sidewall of the second chamber to discharge air from the second chamber to the second conduit system to deliver air to the low portion of the inner space and a second air outlet in the second chamber to deliver air to the second conduit system to direct it to the surfaces of the windows of the passenger compartment, the second chamber containing an oscillating manually operable interception member arranged to close the supply of air under pressure into the said second chamber and to open the discharge of the said chamber towards the said first outlet opening or towards the said second outlet opening.

8. A ventilation system according to claim 7 in which the said interception member in the second chamber is coaxial with the axis of the said second chamber and comprises a pair of first plane walls each of which is disposed substantially in a radial plane of the second chamber, the said walls forming with one another a predetermined angle, and a substantially cylindrical second wall projecting from the end edge of one of the said first walls and arranged to close the air inlet opening and the air outlet opening of the second chamber, and third walls orthogonal to the preceding walls and arranged to close the said second outlet opening of the said second chamber, the said interception member being arranged to assume a first angular position in which the said second wall is positioned in front of the said air inlet opening of the said second chamber to close it, a second angular position in which the said second wall is positioned in front of the said first air outlet opening of the said second chamber to close it while the said third walls leave free a passage towards the said second air outlet opening, and a third angular position in which the said third walls place themselves in front of the said second air outlet opening to close it while the said first walls convey the air from the said air inlet to the first air outlet opening.

* * * * *